Oct. 16, 1962  F. MOHR ETAL  3,058,494
METAL TUBBING
Filed Oct. 4, 1957
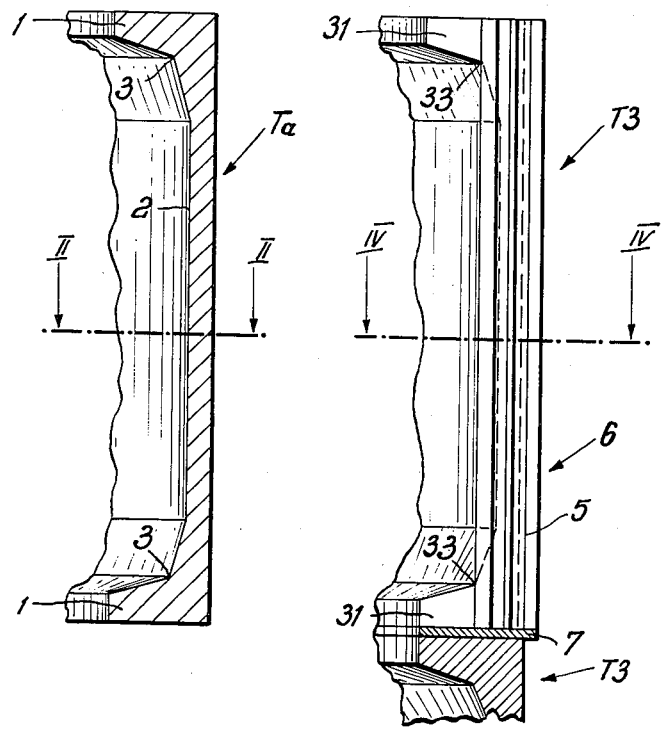
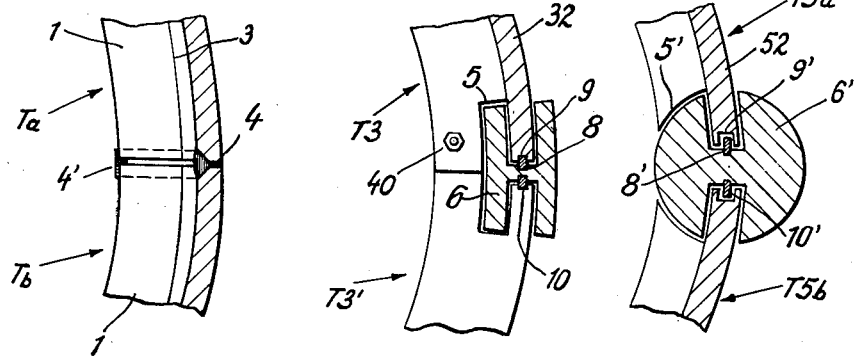
INVENTORS:
FRITZ MOHR and
WILHELM BÖDDICKER
BY Karl F. Ross
AGENT 3,058,494
METAL TUBBING
Fritz Mohr, Brucker Holt 17, and Wilhelm Böddicker, Einigkeitstrasse 10A, both of Essen-Bredeney, Germany
Filed Oct. 4, 1957, Ser. No. 688,193
1 Claim. (Cl. 138—158)

Our present invention relates to metal tubbing as used to line mine shafts and the like.

In general, such tubbing consists of a plurality of superposed cylindrical sections provided at their ends with annular, inwardly directed flanges forming enlarged contact surfaces. To produce such sections by a process other than casting, which is a cumbersome procedure and results in unduly bulky and heavy pieces, it has hitherto been necessary to weld the flanges onto rolled cylinders or cylinder segments of sheet steel. Such welded tubbing segments are, however, not satisfactory for many purposes, the principal reason being that the welded joint between flange and cylinder is located at the very point at which maximum stresses occur in use. This is true even where the horizontal weld is displaced from the flange proper toward a zone of normally lesser stress, it having been found that any such horizontal joint will always constitute a critical cross section. The resulting weakness, even when duly ascertained by X-ray examination or other inspection techniques, can be cured only in part and by costly separate processing. Moreover, the inherently advantageous use of light-weight alloys necessitates the employment of special welding methods (e.g. welding in a heated atmosphere) if a mechanically strong bond is to be obtained. A further drawback of welded sections is to be seen in the annealing of tempered steels which, when used for this purpose, will thus lose their desirable physical properties to a not inconsiderable extent. To offset this defect, it would be necessary to subject each segment after welding to a new heat treatment which, however, not only is extremely costly but requires special large-size tempering furnaces not normally available.

The present invention has for one of its principal objects the provision of improved metal tubbing of the character described designed to avoid the difficulties referred to.

A further object of this invention is the provision of compact and stress-resistant sections adapted to be used in the erection of metal tubbing.

One of the features of our invention resides in the formation of each tubbing section from one or more flanged cylindrical segments integrally rolled from sheet steel or the like. We have found that such integral rolling may be readily accomplished if an excess of material is provided at the junction between the cylinder web and its flanges, the thickness of both flange and web increasing gradually toward their junction so as to form a reinforced throat portion. This excess material not only facilitates the rolling operation itself and strengthens the tubbing segment against shear and bending stresses but also, in accordance with another feature of this invention, enables the rolled body (if made of suitably alloyed steel) to be tempered in a manner utilizing the residual heat stored in the said throat portion. Thus, the rolled section may be heat-treated and quenched in the usual manner (e.g. by means of a water spray) to an extent sufficient to cool the thinner web and flange portions, whereupon the heat still stored in the reinforced throat portion is allowed to anneal the surrounding zones and particularly to the sensitive junction between flange and web. This tempering operation may be carried out either after or before the rolled body has been bent into its cylindrical shape; in the latter event such bending may be effected cold, with a resulting recrystalization and further strengthening of the structure.

In many cases it will be possible to interconnect adjacent segments of a single section by welding. In contradistinction to the formation of a horizontal seam in the region of the flange, the existence of a vertical weld between segments will not be objectionable since no appreciable stresses are to be expected at their junction. In cases where welding is not practical for any reason, an upright connector member with vertical grooves may be inserted between adjacent segments in interleaved relationship therewith to form a tight joint. Additionally, packing strips may be introduced between the connector member and the web of each associated segment to insure the existence of a perfect seal.

The individual segments forming part of a single tubbing section may be provided, according to a further feature of the invention, with longitudinal wings spanning the end flanges, preferably over their full depth, which lie in axial planes and form enlarged contact surfaces for adjoining segments of the same section. These wings may be originally formed as linear extensions of the rolled web, to be subsequently bent over to form a radial flap. They may, however, also be constituted by separate plates subsequently secured to the sides of the segment by welding (in cases where the risk of annealing resulting from such operation is not objectionable) or by other suitable means.

The above and other objects and features of the invention will become more fully apparent from the following detailed description, reference being made to the accompanying drawing in which:

FIG. 1 is a sectional elevational view of a tubbing segment embodying the invention;

FIG. 2 is a cross-sectional view taken on the line II—II of FIG.1;

FIG. 3 is a side-elevational view of a modified segment similar to that of FIG. 1;

FIG. 4 is a cross-sectional view taken on the line IV—IV of FIG. 3, showing the connector member associated with the segment; and FIG. 5 is a sectional view similar to FIG. 4, showing a modified form af connector member.

In FIGS. 1 and 2 there are shown a pair of adjoining tubbing segments $Ta$, $Tb$ each comprising upper and lower flanges 1 interconnected by a web 2 extending over part of a cylinder surface. The web 2 and each flange 1 are enlarged at their junction to form a reinforced throat portion 3. At 4 there has been indicated a vertical welding seam joining the webs of segments $Ta$ and $Tb$ together.

In the tempering process referred to above, the residual heat of throat portion 3, remaining after a quenching operation, is used to anneal the segment particularly at the critical junction between web and flange so as to insure the highest stress resitance at that location. It will be understood that, if desired, this residual heat may be augmented, either before or after quenching, by heat especially applied to throat portion 3 from an outside source.

Years of experience have shown that fractures of tubbing segments originate almost exclusively at the normally weak junction of web and flange and that any fracture at a different location usually represents merely a secondary phenomenon. The reinforced throat portion in a segment according to the invention obviates this danger. Moreover, very little rigidity is required for the longitudinal connection between adjacent segments $Ta$ and $Tb$, hence the weld 4 need only be strong enough to act as a water-proofing seal. With this type of weld there will be very little danger of objectionably annealing the tempered steel of the structure. It will be appreciated that the weld may be extended to solidify the flange portions 1 of adjacent segments as indicated in the drawing at 4'.

The embodiments shown in FIGS. 3 to 5 are particularly suitable for mining sites of such nature that welding within the shaft cannot be undertaken. The segment T3 of FIGS. 3 and 4 is generally similar to segment T*a* or T*b* of the preceding embodiment but has its flanges 31 provided with aligned cutouts 5 to accommodate one of the legs of a vertical connector member 6 of generally H-shaped cross section. In addition, the bridge of the H and the web 32 may be provided with facing, vertical channels 8 and 9, respectively, to receive a packing strip 10 coextensive with member 6, thus extending over the full height of segment T3. It will be apparent that in this manner a tight seal substantially equivalent to the weld 4 of FIG. 2 will be obtained between adjacent segments. As likewise shown in FIG. 3, a horizontal packing ring 7, coextensive with flange 31, is inserted between segment T3 and an adjacent segment T3' of the next lower tubbing section, these segments being preferably angularly offset with respect to each other to form a more rigid structure when their flanges are interconnected by suitable fastening means such as screws 40 (FIG. 4). The reinforced throat zone of segment T3 has been indicated at 33.

In FIG. 5 there have been shown a pair of segments T5*a*, T5*b* which are generally similar to segment T3 but are formed with modified cutouts 5' to accommodate a connecting member 6' of circular cross section, the webs 52 of the segments extending into generally radial cutouts of member 6'. Vertical channels 8' and 9' are again provided in the connecting member and in the webs to receive packing strips 10'.

The invention is, of course, not limited to the specific embodiments described and illustrated but may be realized in various modifications and adaptations without departing from the spirit and scope of the appended claims.

We claim:

A section of tubbing comprising a plurality of cylinder segments of rolled tempered steel each having a web with integral end flanges and a reinforced throat portion at the junction of said web with each of said flanges, said segments complementing one another to form a complete cylinder, each of said segments having a constant profile in the peripheral direction of the cylinder; an elongated connector member interposed between the webs of adjacent segments, the flanges of said segments being provided with cutouts accommodating portions of said connector member in interleaved relationship with said webs, said connector member and said webs being provided with facing channels extending over the entire length of said segments and of said member; and a packing strip received in said facing channels.

References Cited in the file of this patent

UNITED STATES PATENTS

| | | |
|---|---|---|
| 211,241 | Koch | Jan. 7, 1879 |
| 400,262 | Smith | Mar. 26, 1889 |
| 558,436 | Thomas | Apr. 14, 1896 |
| 1,083,579 | Wolhaupter | Jan. 6, 1914 |
| 1,787,907 | Hutson | Jan. 6, 1931 |
| 1,981,950 | Dodge | Nov. 27, 1934 |
| 2,002,987 | Schulz | May 28, 1935 |
| 2,096,850 | Forsberg | Oct. 26, 1937 |
| 2,540,141 | Shafer | Feb. 6, 1951 |
| 2,668,131 | Hamm | Feb. 2, 1954 |
| 2,799,603 | Wellman | July 16, 1957 |